(12) United States Patent
Okada

(10) Patent No.: US 8,134,107 B2
(45) Date of Patent: Mar. 13, 2012

(54) PROJECTION DISPLAY APPARATUS HAVING A CORRELATION TABLE THAT STORES THE CORRELATION BETWEEN AN EXTERNAL CONDITION AND THE VALUE OF POWER SUPPLIED TO A LIGHT SOURCE

(75) Inventor: Takayuki Okada, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 343 days.

(21) Appl. No.: 12/450,501

(22) PCT Filed: Mar. 26, 2008

(86) PCT No.: PCT/JP2008/055681
§ 371 (c)(1),
(2), (4) Date: Sep. 29, 2009

(87) PCT Pub. No.: WO2008/123290
PCT Pub. Date: Oct. 16, 2008

(65) Prior Publication Data
US 2010/0079731 A1 Apr. 1, 2010

(30) Foreign Application Priority Data
Mar. 30, 2007 (JP) ................. 2007-092052

(51) Int. Cl.
*G01J 1/32* (2006.01)
(52) U.S. Cl. .......................... 250/205; 353/52
(58) Field of Classification Search .................. 250/205, 250/208.1, 214 R, 214 AL; 353/52, 55, 85; 362/294, 345; 315/312, 360; 345/212, 46–48
See application file for complete search history.

(56) References Cited

U.S. PATENT DOCUMENTS

| | | | |
|---|---|---|---|
| 6,322,218 B1 | 11/2001 | Sugawara et al. | |
| 7,273,286 B2 * | 9/2007 | Ikebe et al. | ............ 353/85 |
| 7,331,677 B2 | 2/2008 | Horiguchi et al. | |
| 2002/0118160 A1 | 8/2002 | Nakamura et al. | |
| 2003/0020884 A1 | 1/2003 | Okada et al. | |

(Continued)

FOREIGN PATENT DOCUMENTS

JP 10-238384 9/1998

(Continued)

OTHER PUBLICATIONS

Japanese Office Action dated Jan. 11, 2011, with partial English translation.

*Primary Examiner* — Que T Le
(74) *Attorney, Agent, or Firm* — McGinn IP Law Group, PLLC

(57) ABSTRACT

A projection display apparatus of the present invention includes: a lamp power controller 13 changing the value of power supplied to super-high pressure mercury lamp 21; atmospheric pressure sensor 61 detecting the atmospheric pressure around where projection display apparatus 1 is installed; and correlation table storage 53 in which information on power supplied to the light source, set up corresponding to atmospheric pressure is stored. Lamp power controller 13, based on the previously stored information on power supplied to super-high pressure mercury lamp 21, set up corresponding to the atmospheric pressure, controls the power supplied to super-high pressure mercury lamp 21 in accordance with the atmospheric pressure detected by atmospheric pressure sensor 61.

18 Claims, 12 Drawing Sheets

U.S. PATENT DOCUMENTS

| | | |
|---|---|---|
| 2006/0066816 A1 | 3/2006 | Horiguchi et al. |
| 2006/0067049 A1 | 3/2006 | Horiguchi et al. |

FOREIGN PATENT DOCUMENTS

| | | |
|---|---|---|
| JP | 11-211993 | 8/1999 |
| JP | 2000-194072 | 7/2000 |
| JP | 2000-347562 | 12/2000 |
| JP | 2002-258237 | 9/2002 |
| JP | 2003-43585 | 2/2003 |
| JP | 2004-157356 | 6/2004 |
| JP | 2004-245987 A | 9/2004 |
| JP | 2004-362820 | 12/2004 |
| JP | 2004-362820 A | 12/2004 |
| JP | 2005-77638 | 3/2005 |
| JP | 2005-181412 | 7/2005 |
| JP | 2005-189323 | 7/2005 |
| JP | 2005-189323 A | 7/2005 |
| JP | 2006-91610 | 4/2006 |
| JP | 2006-91610 A | 4/2006 |
| JP | 2006-91611 | 4/2006 |
| JP | 2006-293120 | 10/2006 |

* cited by examiner

Operational Mode Selection Menu

|  | Normal Mode | Silent Highland Mode | Optimal Highland Mode |
|---|---|---|---|
| 0ft-3000ft | 4000lm | 4000lm | 4000lm |
| 3000ft-6000ft |  | 3733lm | 3840lm |
| 6000ft-9000ft |  | 3467lm | 3680lm |
| 9000ft-12000ft |  | 3200lm | 3520lm |
| 12000ft-15000ft |  | 2933lm | 3360lm |
| 15000ft-18000ft |  | 2667lm | 3200lm |
| 18000ft-21000ft |  | 2400lm | 3040lm |
| 21000ft-24000ft |  | 2133lm | 2880lm |
| 24000ft-27000ft |  | 1867lm | 2720lm |
| 27000ft-30000ft |  | 1600lm | 2560lm |

\* Normal mode is applied to 3,000 ft or below, silent highland mode gives priority to noise, and optimal highland mode is the mode optimizing brightness and noise.

Fig.4

Normal Mode (Low-level Ground)

| Altitude [ft] | Lamp Power [W] | Brightness [lm] | | | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|
| | | | | | | | | | | Ambient Environmental Temperature[°C] | | | | | | | | | | |
| 0-3000 | 300 | 4000 | Lamp Fan | [rpm] | ↑ | ↑ | ↑ | ↑ | ↑ | 1800 | 2000 | 2110 | 2220 | 2330 | 2440 | 2550 | 2680 | 2770 | 2880 | 2990 |
| | | | LCD Fan | [rpm] | ↑ | ↑ | ↑ | ↑ | ↑ | 1900 | 2100 | 2240 | 2390 | 2520 | 2660 | 2800 | 2940 | 3060 | 3220 | 3360 |
| | | | Air Exhaust Fan | [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | Noise | [dB] | ↑ | ↑ | ↑ | ↑ | ↑ | 35 | 36 | 37 | 38 | 39 | 40 | 41 | 42 | 43 | 44 | 45 |

Fig.5

| Silent Highland Mode | Altitude [ft] | Lamp Power [W] | Brightness [lm] | | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|
| | | | | | | | | | | Ambient Environmental Temperature [°C] | | | | | | | | | | |
| | 27000-30000 | 120 | 1600 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 24000-27000 | 140 | 1867 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 21000-24000 | 160 | 2133 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 18000-21000 | 180 | 2400 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 15000-18000 | 200 | 2667 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 12000-15000 | 220 | 2933 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 9000-12000 | 240 | 3200 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 6000-9000 | 260 | 3467 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 3000-6000 | 280 | 3733 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 0-3000 | 300 | 4000 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |

Fig. 6

| Optimal Highlar Mode | Altitude [ft] | Lamp Power [W] | Brightness [lm] | | Ambient Environmental Temperature [°C] | | | | | | | | | | | | | | | | |
|---|---|---|---|---|---|---|---|---|---|---|---|---|---|---|---|---|---|---|---|---|---|
| | | | | | 20 | 21 | 22 | 23 | 24 | 25 | 26 | 27 | 28 | 29 | 30 | 31 | 32 | 33 | 34 | 35 |
| | 27000-30000 | 192 | 2500 | Lamp Fan [rpm] | 2330 | 2440 | 2550 | 2660 | 2770 | 2880 | 2990 | ↓ | ↓ | ↓ | ↓ | ↓ | ↓ | ↓ | ↓ | ↓ |
| | | | | LCD Fan [rpm] | 2520 | 2660 | 2800 | 2940 | 3080 | 3220 | 3360 | ↓ | ↓ | ↓ | ↓ | ↓ | ↓ | ↓ | ↓ | ↓ |
| | | | | Air Exhaust Fan [rpm] | 1340 | 1400 | 1460 | 1520 | 1580 | 1640 | 1700 | ↓ | ↓ | ↓ | ↓ | ↓ | ↓ | ↓ | ↓ | ↓ |
| | | | | Noise [dB] | 39 | 40 | 41 | 42 | 43 | 44 | 45 | ↓ | ↓ | ↓ | ↓ | ↓ | ↓ | ↓ | ↓ | ↓ |
| | 24000-27000 | 204 | 2720 | Lamp Fan [rpm] | 2220 | 2330 | 2440 | 2550 | 2660 | 2770 | 2880 | 2990 | ↓ | ↓ | ↓ | ↓ | ↓ | ↓ | ↓ | ↓ |
| | | | | LCD Fan [rpm] | 2380 | 2520 | 2660 | 2800 | 2940 | 3080 | 3220 | 3360 | ↓ | ↓ | ↓ | ↓ | ↓ | ↓ | ↓ | ↓ |
| | | | | Air Exhaust Fan [rpm] | 1280 | 1340 | 1400 | 1460 | 1520 | 1580 | 1640 | 1700 | ↓ | ↓ | ↓ | ↓ | ↓ | ↓ | ↓ | ↓ |
| | | | | Noise [dB] | 38 | 39 | 40 | 41 | 42 | 43 | 44 | 45 | ↓ | ↓ | ↓ | ↓ | ↓ | ↓ | ↓ | ↓ |
| | 21000-24000 | 216 | 2880 | Lamp Fan [rpm] | 2110 | 2220 | 2330 | 2440 | 2550 | 2660 | 2770 | 2880 | 2990 | ↓ | ↓ | ↓ | ↓ | ↓ | ↓ | ↓ |
| | | | | LCD Fan [rpm] | 2240 | 2380 | 2520 | 2660 | 2800 | 2940 | 3080 | 3220 | 3360 | ↓ | ↓ | ↓ | ↓ | ↓ | ↓ | ↓ |
| | | | | Air Exhaust Fan [rpm] | 1220 | 1280 | 1340 | 1400 | 1460 | 1520 | 1580 | 1640 | 1700 | ↓ | ↓ | ↓ | ↓ | ↓ | ↓ | ↓ |
| | | | | Noise [dB] | 37 | 38 | 39 | 40 | 41 | 42 | 43 | 44 | 45 | ↓ | ↓ | ↓ | ↓ | ↓ | ↓ | ↓ |
| | 18000-21000 | 228 | 3040 | Lamp Fan [rpm] | 2000 | 2110 | 2220 | 2330 | 2440 | 2550 | 2660 | 2770 | 2880 | 2990 | ↓ | ↓ | ↓ | ↓ | ↓ | ↓ |
| | | | | LCD Fan [rpm] | 2100 | 2240 | 2380 | 2520 | 2660 | 2800 | 2940 | 3080 | 3220 | 3360 | ↓ | ↓ | ↓ | ↓ | ↓ | ↓ |
| | | | | Air Exhaust Fan [rpm] | 1160 | 1220 | 1280 | 1340 | 1400 | 1460 | 1520 | 1580 | 1640 | 1700 | ↓ | ↓ | ↓ | ↓ | ↓ | ↓ |
| | | | | Noise [dB] | 36 | 37 | 38 | 39 | 40 | 41 | 42 | 43 | 44 | 45 | ↓ | ↓ | ↓ | ↓ | ↓ | ↓ |
| | 15000-18000 | 240 | 3200 | Lamp Fan [rpm] | 1890 | 2000 | 2110 | 2220 | 2330 | 2440 | 2550 | 2660 | 2770 | 2880 | 2990 | ↓ | ↓ | ↓ | ↓ | ↓ |
| | | | | LCD Fan [rpm] | 1960 | 2100 | 2240 | 2380 | 2520 | 2660 | 2800 | 2940 | 3080 | 3220 | 3360 | ↓ | ↓ | ↓ | ↓ | ↓ |
| | | | | Air Exhaust Fan [rpm] | 1100 | 1160 | 1220 | 1280 | 1340 | 1400 | 1460 | 1520 | 1580 | 1640 | 1700 | ↓ | ↓ | ↓ | ↓ | ↓ |
| | | | | Noise [dB] | 35 | 36 | 37 | 38 | 39 | 40 | 41 | 42 | 43 | 44 | 45 | ↓ | ↓ | ↓ | ↓ | ↓ |
| | 12000-15000 | 252 | 3360 | Lamp Fan [rpm] | ↑ | ↑ | ↑ | ↑ | ↑ | 1890 | 2000 | 2110 | 2220 | 2330 | 2440 | 2550 | 2660 | 2770 | 2880 | 2990 |
| | | | | LCD Fan [rpm] | ↑ | ↑ | ↑ | ↑ | ↑ | 1960 | 2100 | 2240 | 2380 | 2520 | 2660 | 2800 | 2940 | 3080 | 3220 | 3360 |
| | | | | Air Exhaust Fan [rpm] | ↑ | ↑ | ↑ | ↑ | ↑ | 1100 | 1160 | 1220 | 1280 | 1340 | 1400 | 1460 | 1520 | 1580 | 1640 | 1700 |
| | | | | Noise [dB] | ↑ | ↑ | ↑ | ↑ | ↑ | 35 | 36 | 37 | 38 | 39 | 40 | 41 | 42 | 43 | 44 | 45 |
| | 9000-12000 | 264 | 3520 | Lamp Fan [rpm] | ↑ | ↑ | ↑ | ↑ | 1890 | 1960 | 2110 | 2220 | 2330 | 2440 | 2550 | 2660 | 2770 | 2880 | 2880 | 2880 |
| | | | | LCD Fan [rpm] | ↑ | ↑ | ↑ | ↑ | 1960 | 2000 | 2240 | 2380 | 2520 | 2660 | 2800 | 2940 | 3080 | 3220 | 3220 | 3220 |
| | | | | Air Exhaust Fan [rpm] | ↑ | ↑ | ↑ | ↑ | 1100 | 1100 | 1220 | 1280 | 1340 | 1400 | 1460 | 1520 | 1580 | 1640 | 1640 | 1640 |
| | | | | Noise [dB] | ↑ | ↑ | ↑ | ↑ | 35 | 35 | 37 | 38 | 39 | 40 | 41 | 42 | 43 | 44 | 44 | 44 |
| | 6000-9000 | 276 | 3680 | Lamp Fan [rpm] | ↑ | ↑ | ↑ | 1890 | 1960 | 2000 | 2110 | 2220 | 2330 | 2440 | 2550 | 2660 | 2770 | 2770 | 2770 | 2770 |
| | | | | LCD Fan [rpm] | ↑ | ↑ | ↑ | 1960 | 2000 | 2100 | 2240 | 2380 | 2520 | 2660 | 2800 | 2940 | 3080 | 3080 | 3080 | 3080 |
| | | | | Air Exhaust Fan [rpm] | ↑ | ↑ | ↑ | 1100 | 1100 | 1160 | 1220 | 1280 | 1340 | 1400 | 1460 | 1520 | 1580 | 1580 | 1580 | 1580 |
| | | | | Noise [dB] | ↑ | ↑ | ↑ | 35 | 35 | 36 | 37 | 38 | 39 | 40 | 41 | 42 | 43 | 43 | 43 | 43 |
| | 3000-6000 | 288 | 3840 | Lamp Fan [rpm] | ↑ | ↑ | 1890 | 1960 | 2000 | 2100 | 2210 | 2240 | 2330 | 2440 | 2550 | 2660 | 2660 | 2660 | 2660 | 2660 |
| | | | | LCD Fan [rpm] | ↑ | ↑ | 1960 | 2100 | 2240 | 2240 | 2380 | 2520 | 2660 | 2800 | 2940 | 3080 | 3080 | 3080 | 3080 | 3080 |
| | | | | Air Exhaust Fan [rpm] | ↑ | ↑ | 1100 | 1160 | 1220 | 1220 | 1280 | 1340 | 1400 | 1460 | 1520 | 1580 | 1580 | 1580 | 1580 | 1580 |
| | | | | Noise [dB] | ↑ | ↑ | 35 | 36 | 37 | 37 | 38 | 39 | 40 | 41 | 42 | 43 | 43 | 43 | 43 | 43 |
| | 0-3000 | 300 | 4000 | Lamp Fan [rpm] | ↑ | 1890 | 1960 | 2000 | 2100 | 1960 | 2000 | 2110 | 2220 | 2330 | 2440 | 2550 | 2550 | 2550 | 2550 | 2550 |
| | | | | LCD Fan [rpm] | ↑ | 1960 | 2100 | 2240 | 2380 | 2100 | 2240 | 2380 | 2520 | 2660 | 2800 | 2800 | 2800 | 2800 | 2800 | 2800 |
| | | | | Air Exhaust Fan [rpm] | ↑ | 1100 | 1160 | 1220 | 1280 | 1160 | 1220 | 1280 | 1340 | 1400 | 1460 | 1520 | 1520 | 1520 | 1520 | 1520 |
| | | | | Noise [dB] | ↑ | 35 | 36 | 37 | 38 | 36 | 37 | 38 | 39 | 40 | 41 | 42 | 42 | 42 | 42 | 42 |

Fig.7

Conventional Highland Mode

| Altitude [ft] | Lamp Power [W] | Brightness [lm] | | | Ambient Environmental Temperature [°C] | | | | | | | | | | | | | | | | |
|---|---|---|---|---|---|---|---|---|---|---|---|---|---|---|---|---|---|---|---|---|---|
| | | | | | 20 | 21 | 22 | 23 | 24 | 25 | 26 | 27 | 28 | 29 | 30 | 31 | 32 | 33 | 34 | 35 |
| 6000-7500 | 300 | 4000 | Lamp Fan | [rpm] | 2000 | 2110 | 2220 | 2330 | 2440 | 2550 | 2660 | 2770 | 2880 | 2990 | ↓ | ↓ | ↓ | ↓ | ↓ | ↓ |
| | | | LCD Fan | [rpm] | 2100 | 2240 | 2380 | 2520 | 2660 | 2800 | 2940 | 3080 | 3220 | 3300 | ↓ | ↓ | ↓ | ↓ | ↓ | 2990 |
| | | | Air Exhaust Fan | [rpm] | 1100 | 1220 | 1260 | 1340 | 1400 | 1460 | 1520 | 1560 | 1640 | 1700 | ↓ | ↓ | ↓ | ↓ | ↓ | 3300 |
| | | | Noise | [dB] | 36 | 37 | 38 | 39 | 40 | 41 | 42 | 43 | 44 | 45 | ↓ | ↓ | ↓ | ↓ | ↓ | 1700 |
| 3000-6000 | 300 | 4000 | Lamp Fan | [rpm] | ↑ | 1800 | 2050 | 2110 | 2220 | 2330 | 2440 | 2550 | 2660 | 2770 | 2880 | 2990 | ↓ | ↓ | ↓ | ↓ |
| | | | LCD Fan | [rpm] | ↑ | 1900 | 2100 | 2240 | 2380 | 2520 | 2660 | 2800 | 2940 | 3080 | 3220 | 3300 | ↓ | ↓ | ↓ | ↓ |
| | | | Air Exhaust Fan | [rpm] | ↑ | 1100 | 1160 | 1220 | 1260 | 1340 | 1400 | 1460 | 1520 | 1560 | 1640 | 1700 | ↓ | ↓ | ↓ | ↓ |
| | | | Noise | [dB] | ↑ | 35 | 36 | 37 | 38 | 39 | 40 | 41 | 42 | 43 | 44 | 45 | ↓ | ↓ | ↓ | ↓ |
| 0-3000 | | | Lamp Fan | [rpm] | ↑ | ↑ | ↑ | ↑ | ↑ | 1880 | 2000 | 2110 | 2220 | 2330 | 2440 | 2550 | 2660 | 2770 | 2880 | 2990 |
| | | | LCD Fan | [rpm] | ↑ | ↑ | ↑ | ↑ | ↑ | 1960 | 2100 | 2240 | 2380 | 2520 | 2660 | 2800 | 2940 | 3080 | 3220 | 3300 |
| | | | Air Exhaust Fan | [rpm] | ↑ | ↑ | ↑ | ↑ | ↑ | 1100 | 1100 | 1220 | 1260 | 1340 | 1400 | 1460 | 1520 | 1560 | 1640 | 1700 |
| | | | Noise | [dB] | ↑ | ↑ | ↑ | ↑ | ↑ | 35 | 36 | 37 | 38 | 39 | 40 | 41 | 42 | 43 | 44 | 45 |

PROJECTION DISPLAY APPARATUS HAVING A CORRELATION TABLE THAT STORES THE CORRELATION BETWEEN AN EXTERNAL CONDITION AND THE VALUE OF POWER SUPPLIED TO A LIGHT SOURCE

TECHNICAL FIELD

The present invention relates to a projection display apparatus.

BACKGROUND ART

For the light source of projection display apparatus, high-power light sources that produce a large amount of heat such as metal halide lamps, super-high pressure mercury lamps, etc., have been used in order to ensure a bright projected image. These light sources that produce a large amount of heat may thermally deform the surrounding structural parts due to elevation in temperature, or may reduce the lifetime of the arc tubes. In particular, there is a close correlation between the life of the arc tube and temperature, so that cooling for keeping the optimal temperature range is required.

Light generated by the light source is shaped into an image through an optical engine, then is enlarged by a projection lens to be projected on a screen. The optical engine is provided with a plurality of optical parts such as liquid crystal panels etc.; these optical parts are also elevated in temperature due to transmission and reflection of strong light. This elevation in temperature makes the operation of the liquid crystal panels unstable and changes the properties of various kinds of optical parts, deteriorating the projected image and shortening the lives of the optical parts. That is, suppressing elevation in temperature of the optical parts will maintain the optical performance and lengthen the life of the optical parts, so that cooling of the optical parts is essential to enhance the performance and reliability of the apparatus.

Under these circumstances, presentations that use a projection display apparatus have become widespread with the spread of personal computers, and the chances of using a projection display apparatus at high altitude locations such as mountainous regions are increasing.

However, when a projection display apparatus is used in a high altitude area, there is a greater increase in the temperature of the optical parts, including the lamp and liquid crystal panels, than in the case when the projection display apparatus used at a low altitude. This occurs because the air is thin at highlands due to low atmospheric pressure, hence heat transfer of the heat generated in the apparatus to the air is suppressed.

As the related art to solve this problem, there is disclosed the following technology in which a pressure sensor is provided for a projection display apparatus to detect atmospheric pressure, and the rotation rate of the air-cooling fan is increased in accordance with the detected atmospheric pressure.

Disclosed in Japanese Patent Application Laid-open 2004-157365 is a projector including a cooling mechanism and a cooling control selecting means for selecting and setting up the drive control of this cooling mechanism in accordance with the altitude of the place it is to be used where so as to be able to a secure sufficient cooling effect even if it is used at highlands.

Japanese Patent Application Laid-open 2000-194072 discloses a projection display apparatus, which includes: a fan for cooling the housing interior; a temperature detecting element for detecting the temperature in the vicinity of the liquid crystal light bulb; and a control unit for correcting the temperature detected by the temperature detecting element based on a predetermined temperature correcting value, controlling the rotation rate of the fan based on the corrected temperature and performing on/off control of the power source to the lamp, so as not to lower reliability depending on a change in the environment where the apparatus is used.

Japanese Patent Application Laid-open 2002-258237 discloses a liquid crystal projector, which includes: a temperature sensor for detecting the interior temperature; an air pressure sensor for detecting the outside air pressure; and a control unit for controlling the rotation rate of a cooling fan based on the detected temperature and outside air pressure, and automatically performs suitable control of the cooling fan in accordance with the air pressure at the area where it is used.

Japanese Patent Application Laid-open 2006-91611 discloses a projection video display apparatus including a system control circuit receiving the input of the air pressure data output from an air pressure sensor and the airflow data output from an airflow sensor, in which the system control circuit stores a control table for regulating the additional voltage value to the fan power supply, which is set based on the air pressure value and airflow value, so as to be able to perform optimal cooling control as much as possible even if filter-clogging has occurred.

However, these related technologies are aimed at maintaining the temperature of the lamp portion and various optical parts by increasing the rotation rate of the air-cooling fan to enhance the cooling effect, and there have been two serious problems.

The first problem is that use of the apparatus at highlands entails a significant temperature rise of the heat generating part, hence it is necessary to greatly increase the rotation rate of the air cooling fan, thereby giving rise to a problem of increased noise. For example, when a projection display apparatus is used at an altitude of 1,500 m, a temperature rise of 5 to 15° C. occurs in the optical parts of the optical engine, and the temperature of the arc tube of the lamp produces a temperature rise of 30° C. to 50° C. When this temperature rise is handled by increasing the rotation rate of the fan, the rotation rate of the fan has to be increased to about 1.8 times, and this will increase noise by about 10 dB. The noise level is acoustically felt to be twice as laud because of this value, therefore this is problem.

The second problem is that because there is an upper limit to the rotation rate of the air-cooling fan, an altitude of around 2,300 m is the limit for keeping optical parts of an apparatus at a desired temperature even if this leads to an increase in noise. For example, about 1500 meter is the limit for a typical projection display apparatus in the related art, and even for an apparatus that has "highland mode" for increasing the rotation rate of the fan, the limit is around 2,300 m.

DISCLOSURE OF THE INVENTION

The object of the present invention is to provide a projection display apparatus which is free from an increase of noise and which can keep the parts at a desirable temperature even in highlands.

A projection display apparatus according to the present invention includes: a light source power changing means for changing the value of power supplied to a projecting light source; a storage means for storing an external condition/light source supplied power correlation table that stores the correlation between an external condition and the value of power supplied to the light source that is set up corresponding to the external condition; an external condition information acquiring means for acquiring an ambient external condition; and a light source power control means which acquires the value of power supplied to the light source corresponding to the external condition information acquired by the external condition information acquiring means, from the external condition/light source supplied power correlation table, and which controls the light source power changing means so as to produce the acquired value of supplied power.

BRIEF DESCRIPTION OF DRAWINGS

FIG. 4 is a correlation table in "normal mode", showing the supportable altitude as well as the lamp power, and the rotation rate of each fan as well as the apparatus noise for each altitude, with respect to the ambient environment temperature.

FIG. 5 is a correlation table in "silent highland mode", showing the supportable altitude as well as the lamp power, and the rotation rate of each fan as well as the apparatus noise for each altitude, with respect to the ambient environment temperature.

FIG. 6 is a correlation table in "optimal highland mode", showing the supportable altitude as well as the lamp power, and the rotation rate of each fan as well as the apparatus noise for each altitude, with respect to the ambient environment temperature.

FIG. 7 is a correlation table in "highland mode" of a related technology where the lamp power is constantly fixed with variation in altitude, showing the rotation rate of each fan and the apparatus noise for each altitude, with respect to the ambient environment temperature.

BEST MODE FOR CARRYING OUT THE INVENTION

Next, the exemplary embodiments of the present invention will be described with reference to the drawings.

The First Exemplary Embodiment

Figure 1:
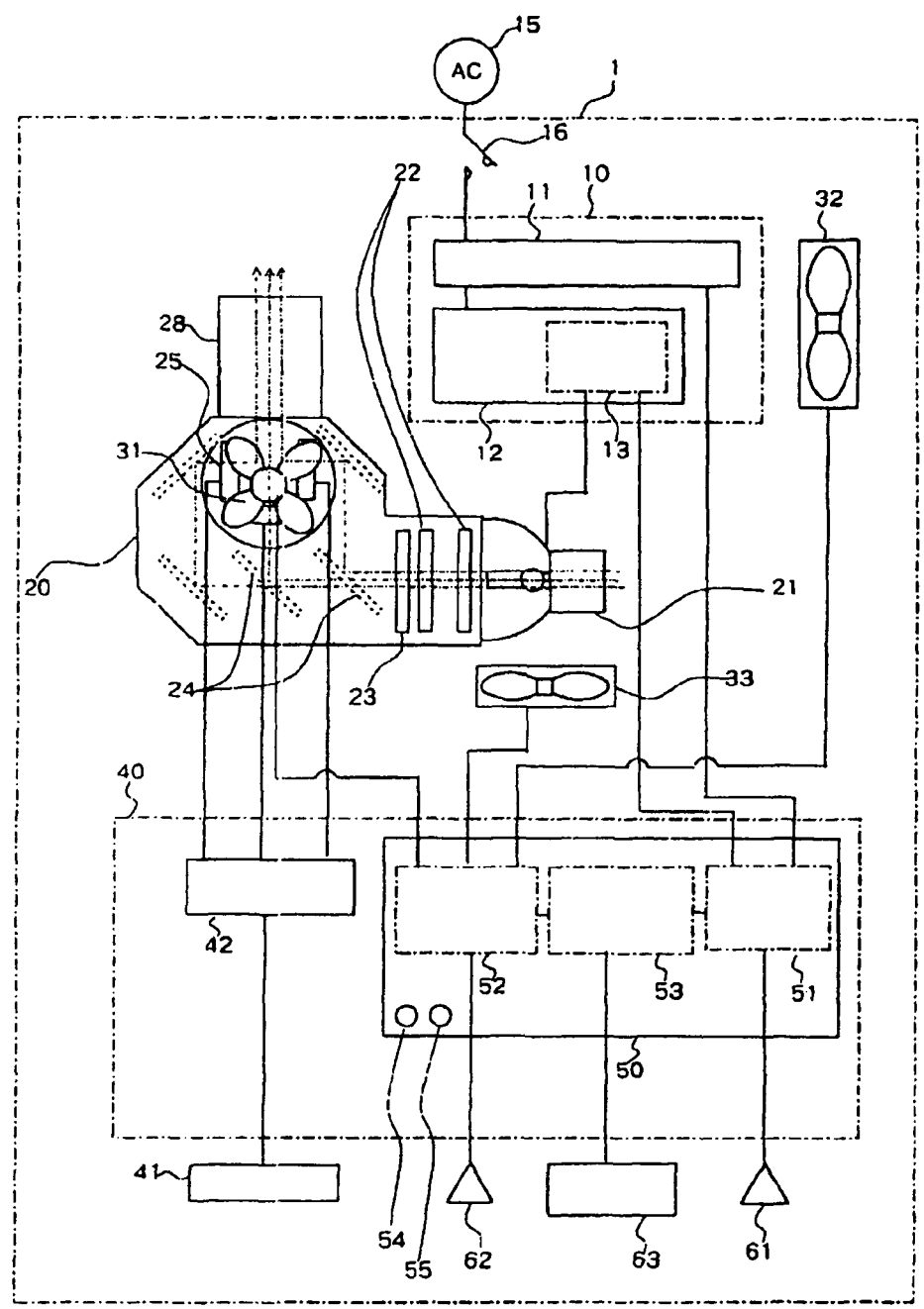
FIG. 1 is a schematic diagram showing the configuration of a projection display apparatus including a three-panel type liquid crystal image display device, according to the first exemplary embodiment of the present invention.
Figures 2, 3:
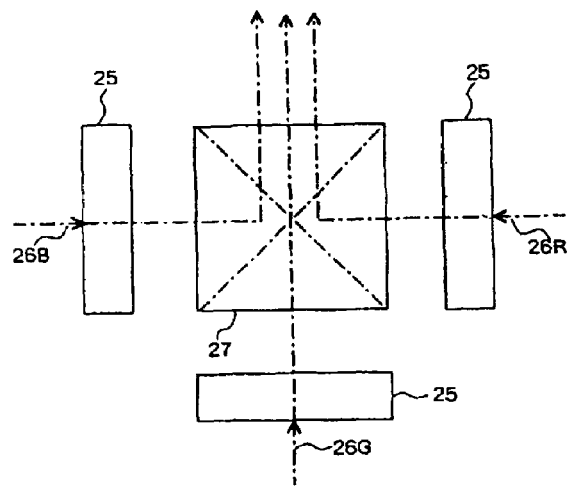
FIG. 2 is an enlarged diagram of a liquid crystal panel portion of the projection display apparatus having a three-panel type liquid crystal image display device shown in FIG. 1.
FIG. 3 is a menu frame on a projected image on a screen upon selection of an operational mode in the apparatus shown in FIG. 1.

FIG. 1 is a schematic diagram showing the configuration of a projection display apparatus including a three-panel type liquid crystal image display device, according to the first exemplary embodiment of the present invention, and FIG. 2 is an enlarged diagram of a liquid crystal panel portion of the projection display apparatus having a three-panel type liquid crystal image display device shown in FIG. 1. Herein, description will be made taking an example of a projection display apparatus having a three-panel type liquid crystal image display device, but the invention should not be limited to this, and can also be applied similarly to a direct-view color image display device or to a single panel type projection image display device.

As shown in FIG. 1, projection display device 1 of the first exemplary embodiment includes: super-high pressure mercury lamp 21; optical engine 20 producing an image by three RGB liquid crystal panels 25 based on emission of light from super-high pressure mercury lamp 21; projecting lens 28 for enlarging the produced image; electric circuit unit 40 including liquid crystal panel drive circuit 42 for driving liquid crystal panels 25 based on the signal from video signal 41 and main control circuit portion 50; power source unit 10 for supplying electric power to electric circuit unit 40 and super-high pressure mercury lamp 21; liquid crystal panel unit cooling fan 31 for cooling the liquid crystal panel unit such as liquid crystal panels 25 etc., provided for optimal engine 20; air exhaust fan 32 cooling power source unit 10, electric circuit unit 40 and optical engine 20; lamp fan 33 for cooling super-high pressure mercury lamp 21; atmospheric pressure sensor 61 for detecting atmospheric pressure at the place where projection display apparatus 1 is installed; temperature sensor 62 for measuring the ambient temperature; and mode select switch 63.

Power source unit 10 comprises: ballast 12 for turning on and off, and stably supplying electric power to, super-high pressure mercury lamp 21; and power source 11 for stably supplying electric power to electric circuit unit 40 and ballast 12. Power source unit 10 is electrically connected to external a.c. power supply 15, through power switch 16.

Ballast 12 is provided with lamp power controller 13 which changes the power to be output to super-high pressure mercury lamp 21 based on the control signal from main control circuit portion 50 provided in electric circuit unit 40.

Main control circuit portion 50 of electric circuit unit 40 includes: lamp power determiner 51 connected with atmospheric pressure sensor 61; fan rotation rate control circuit 52 connected with temperature sensor 62; correlation table storage 53; and startup button switch 54 and stop button switch 55 for starting and ending projection display apparatus 1.

In correlation table storage 53, correlation tables, previously determined by experimental evaluation, between atmospheric pressure data as well as ambient environmental temperature, and the value of power supplied to the lamp and the value of power supplied to the cooling device are classified according to the modes to be selected by mode select switch 63 and stored.

Electric circuit unit 40 also includes liquid crystal panel drive circuit 42 for driving liquid crystal panels 25 based on the signal from video signal 41.

Lamp power determinater 51 refers to the correlation table between atmospheric pressure data and the value of power supplied to the lamp, previously stored in correlation table storage 53, based on the atmospheric pressure data from atmospheric pressure sensor 61, and sends a signal that indicates the value of power supplied to the lamp, from lamp power determinater 51 to lamp power controller 13 of power source unit 10. Based on the signal, lamp power controller 13 controls the value of supplied power that is output to super-high pressure mercury lamp 21.

The cooling of liquid crystal panels 25 is performed by liquid crystal panel unit cooling fan 31, the cooling of electric circuit unit 40, power source unit 10 and optical engine 20 as a whole is performed by air exhaust fan 32, and the cooling of super-high pressure mercury lamp 21 is performed by lamp fan 33.

Each fan is energized from main control circuit portion 50 of electric circuit unit 40, and the rotation rate of the fan is controlled by controlling the supplied power by means of fan rotation rate control circuit 52. In fan rotation rate control circuit 52, the rotation rate of each fan is controlled by referring to the correlation table between environmental temperature data and the value of power supplied to each fan, previously stored in correlation table storage 53, based on the environmental temperature data from temperature sensor 62. No rotation rate control of the fans is performed based on ambient temperature, no temperature sensor 62 is provided, and each fan is supplied with a predetermined amount of electric power from fan rotation rate control circuit 52.

In the present exemplary embodiment, normal mode, silent highland mode and optimal highland mode, which are selectable by mode select switch 63, are provided beforehand in correspondence with presumed use conditions while atmospheric pressure/light source supplied power correlation tables, atmospheric pressure/cooling device supplied power correlation tables, and environmental temperature/cooling device supplied power correlation tables for individual modes are stored in correlation table storage 53. The atmospheric pressure/cooling device supplied power correlation table and the environmental temperature/cooling device supplied power correlation table may be integrated into a combination of atmospheric pressure and environmental temperature/cooling device supplied power correlation table. Since in this exemplary embodiment, control of light source power based on environmental temperature is not performed, no environmental temperature/light source supplied power correlation table is provided. However, if control of light source power based on environmental temperature is performed, environmental temperature/light source supplied power correlation tables may be provided.

As a cooling means, air cooling fans including axial fans and scirocco fans are usually used for liquid crystal panel unit cooling fan 31, air exhaust cooling fan 32, lamp fan 33. For cooling the liquid crystal panel unit, an electronic solid-state cooling device represented by a Peltier device may be used in stead of this. The Peltier device is a cooling device that deprives the heat source of heat by contacting the heat source, and it can produce effective cooling by bringing itself in direct contact with an optical part.

Inside optical engine 20, light integrator 22, polarization converting device 23, dichroic mirror 24, liquid crystal panels 25, etc., are provided.

Next, specific operation of this projection display apparatus 1 will be described.

When power switch 16 is turned on, power supply unit 10 and external a.c. power supply 15 are electrically connected so that electric power set at appropriately converted voltage is supplied to ballast 12 for causing super-high pressure mercury lamp 21 to glow and to electric circuit unit 40, whereby projection display apparatus 1 is set into standby mode.

When startup button switch 54 provided in electric circuit unit 40 is pressed, projection display apparatus 1 is started and atmospheric pressure sensor 61 detects the atmospheric pressure data at the location where projection display apparatus 1 is installed. Since there is a fear that deviation will occur in the measurement of atmospheric pressure sensor 61 due to air flow if the fans are started, the second exemplary embodiment is devised so that the atmospheric pressure data is acquired before startup button switch 54 is pressed.

The relationship between atmospheric pressure as well as environmental temperature and the value of power supplied to the lamp as well as the pertinent rotation rate values of the fans, which were obtained by experimental evaluation at the time of development are stored beforehand as correlation tables in correlation table storage 53 of main control circuit portion 50.

When a mode is selected by mode select switch 63, the correlation table corresponding to the mode becomes extractable. In the present exemplary embodiment, three operational modes are provided, and any one of them is selected based on the previously presumed use environment. That is, the three modes include "normal mode (low-level ground)" for use at low-level ground, "silent highland mode" in which the lamp power is reduced depending on the altitude and "optimal highland mode" in which the lamp power is slightly reduced and the rotation rates of the fans are slightly increased, depending on the altitude.

Lamp power determinater 51 reads the pertinent value of power supplied to the lamp from the correlation between atmospheric pressure and the value of power supplied to the lamp, stored in correlation table storage 53, based on the atmospheric pressure data obtained from atmospheric pressure sensor 61, and sends a signal indicating the value of power supplied to the lamp to lamp power controller 13 provided for ballast 12. Lamp power controller 13 supplies electric power to super-high pressure mercury lamp 21 at the indicated value of electric power.

The light emitted from super-high pressure mercury lamp 21 enters optical engine 20 and is made uniform through optical integrator 22, then the directions of polarization of the light are aligned by polarization converting device 23. Subsequently, the light is separated by dichroic mirror 24 into the three primary colors, red, green and blue, so that each color of light is sent along red light path 26R, green light path 26G or blue light path 26B to liquid crystal panel 25 corresponding to the color.

Liquid crystal panel 25 creates an image corresponding to each color by means of liquid crystal panel drive circuit 42 that receives video signal 41, and each image is synthesized with the others by dichroic prism 27 and projected on an unillustrated screen by way of projecting lens 28.

During these processes, the temperature of super-high pressure mercury lamp 21 and of the optical parts packaged in optical engine 20 is elevated due to light absorption and self-heating.

The arc tube of super-high pressure mercury lamp 21 has an optimum temperature range for continuing bright stable emission of light without flickers, so that it needs to be cooled with good precision by lamp fan 33 operated at a controlled rotation rate.

In the liquid crystal panel unit, cooling of liquid crystal panels 25 is particularly important, and air flow at a high speed of wind is generated by liquid crystal panel unit cooling fan 31 provided at the top of liquid crystal panels 25, so as to cool liquid crystal panels 25 by blowing.

FIG. 3 is a menu frame on the projected image on the screen upon selection of an operational mode in the apparatus shown in FIG. 1.

One of the three kinds of modes, normal mode (low-level ground), silent highland mode or optimal highland mode is selected, so that the power of the light source that corresponds to the altitude as the external condition is selected. Herein, the altitude is used as the external condition, but atmospheric pressure may be used. The external condition may be atmospheric pressure instead of altitude because there is a correlation between atmospheric pressure and altitude.

In the normal mode, the lamp power is constant, the rotation rate of each fan is controlled in accordance with the ambient environmental temperature.

In the silent highland mode, the lamp power is controlled in accordance with the altitude and the rotation rate of each fan is controlled in accordance with the ambient environmental temperature.

In the optimal highland mode, the lamp power is controlled in accordance with the altitude and the rotation rate of each fan is controlled in accordance with the altitude and the ambient environmental temperature.

In the menu frame shown in FIG. 3, the "silent highland mode" is selected. Mode selection can be performed through mode select switch 63 provided for the apparatus or by displaying the menu on the projected screen and using arrow keys, or through arrow keys on a remote controller. The technology for selection and determination itself is commonly used in the projection display apparatuses of the related art, so description is omitted.

FIG. 4, FIG. 5 and FIG. 6 are correlation tables for "normal mode", "silent highland mode" and "optimal highland mode", showing the supportable altitude and the lamp power corresponding to the altitude, and the rotation rate of each fan and the apparatus noise for each altitude, with respect to the ambient environment temperature. This is the information obtained by experimental evaluation at the development stage, and the correlation tables are stored in correlation table storage 53 of main control circuit portion 50 of electric circuit unit 40.

Hereinbelow, the operation of each mode will be sequentially described taking examples.

The "normal mode (low-level ground)" shown in FIG. 4 is an operational mode that is unrelated to altitude (atmospheric pressure), and the lamp power is fixed at a normal power of 300 W while the rotation rates of the fans are increased in accordance with the environmental temperature when it is 25° C. or greater. Here, there is a limit to temperature rise of the apparatus, the supportable altitude should be up to 914 m (3,000 ft). For example, the rotation rates are constant when the environmental temperature is 25° C. or below, and the noise level is 35 dB. As the environmental temperature increases, the rotation rates of the fans are increased, and the noise level is 45 dB when the environmental temperature is 35° C.

The "silent highland mode" shown in FIG. 5 is an operational mode in which generation of heat from super-high pressure mercury lamp 21 is suppressed by lowering the value of power supplied to the lamp as the altitude becomes greater. For example, when the ambient environmental temperature is 25° C., the lamp power is set at 240 W (brightness: 3,200 lm) at an altitude of 2,740 m (9,000 ft) and the lamp power is set at 180 W (brightness: 2,400 lm) at an altitude of 5,490 m (18,000 ft). In this mode, the rotation rates of the fans are set to vary according to the altitude, and the rotation rates of the fans increase as the environmental temperature is elevated. The noise level is 35 dB when the environmental temperature is 25° C. or below, and the noise level is 45 dB when the environmental temperature is 35° C.

The "optimal highland mode" shown in FIG. 6 is an operational mode in which the value of power supplied to the lamp is lowered in some degree as the altitude becomes greater, but the degree of lowering is less than that in the "silent highland mode", and the rotation rates of the fans are slightly increased as the altitude becomes greater according to the minimal degree of lowering. In contrast to the silent highland mode where the lamp power is set at 120 w with a brightness of 1,600 lm when the altitude is 8,230 m to 9,410 m (27,000-30,000 ft), the lamp power is set at 192 w with a brightness of 2,580 lm and the brightness is increased in the optimal highland mode.

Since, though it is slight, the rotation rates of the fans are increased in accordance with the altitude as in the "highland mode" in the related art, the supportable environmental temperature at each altitude is limited by the upper limit of the rotation rates of the fans. For example, at the altitude of 2,740 m (9,000 ft) where the lamp power is set at 264 W (brightness: 3,520 lm), the noise level is 38 dB at the environmental temperature of 25° C., and the supportable environmental temperature will be up to 32° C. At the altitude of 5,490 m (18,000 ft) where the lamp power is set at 228 W (brightness: 3,040 lm), the noise level is 41 dB at the environmental temperature of 25° C., and the supportable environmental temperature will be up to 29° C.

This mode is an operational mode in which the amount of reduction in lamp power is suppressed by permitting a slight increase in noise level. In comparison with the "silent highland mode", the noise level increases by 3 dB at 2,740 m (9,000 ft) and by 6 dB at 6,400 m (21,000 ft), but the lamp power is enhanced by 24 W (brightness: 320 lm) and 48 W (640 lm).

FIG. 7 is for the "highland mode" in a related technology where the lamp power is constantly fixed with variation in altitude, showing the rotation rate of each fan and the apparatus noise for each altitude with respect to the environmental temperature.

In this mode, it is necessary to enhance cooling performance in proportion to an increase in temperature of the apparatus at highlands, hence the higher the altitude, the greater the noise. For example, at low-level ground of 0 m to 910 m (0 ft to 3,000 ft), the rotation rates of the fans and the noise level are the same up to the environmental temperature of 25° C. However, at the altitude of 910 m to 1,830 m (3,000 ft to 6,000 ft), the noise level is 39 dB at the environmental temperature of 25° C. and the supportable environmental temperature will be up to 31° C. At the altitude of 1,830 m to 2,290 m (6,000 ft to 7,500 ft), the noise level is 41 dB at the environmental temperature of 25° C. and the supportable environmental temperature will be up to 29° C.

Finally, on the basis of the "highland mode" of this related art, the effect of the "silent highland mode" and the "optimal highland mode" in the present invention will be shown quantitatively. A comparison will be made under the condition where the environmental temperature is 25° C., which can be assumed to be a typical room temperature.

The supportable altitude in the "highland mode" of the related art is up to 2,290 m (7,500 ft). The noise at this time is increased by 6 dB, amounting to 41 dB (brightness: 4,000 lm). In contrast to this, in the projection display apparatus of the present invention, when the brightness is reduced to 1,600 ml in the "silent highland mode", the noise is kept as low as 35 dB which is the same as at low-level ground and the supportable altitude will be up to 9,140 m (30,000 ft). In the "optimal highland mode", the brightness is only reduced to 2,560 ml, and the supportable altitude that is as high as that of the "silent highland mode", 9,140 m (30,000 ft) is realized by permitting the noise to be up to 44 dB.

Next, the operation from startup to shutdown of the projection display apparatus of the first exemplary embodiment will be described with reference to a flow chart.

Figure 8:
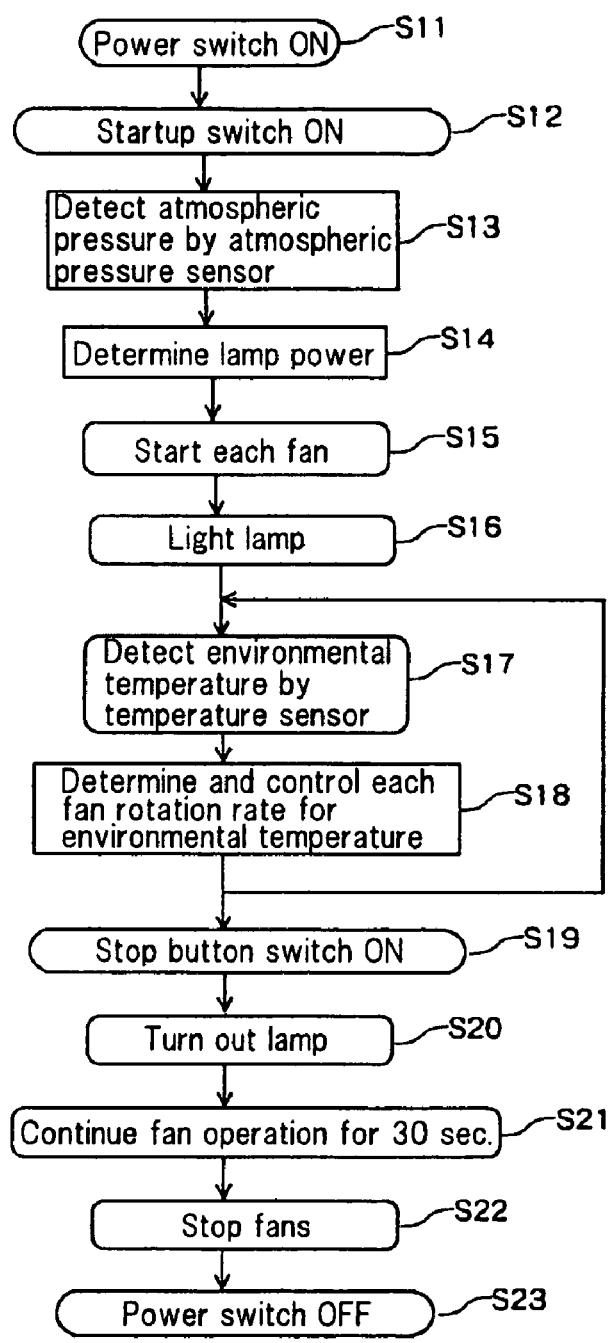
FIG. 8 is a flow chart showing the operation of a projection display apparatus of the first exemplary embodiment, from startup to shutdown.

FIG. 8 is a flow chart showing the operation of the projection display apparatus of the first exemplary embodiment, from startup to shutdown. From this, it is possible to understand the timing when the atmospheric pressure sensor detects atmospheric pressure.

The user of the apparatus turns on power switch 16 in order to supply electricity to the apparatus (S11). Thereby, electric power is supplied from external a.c. power supply 15 to projection display apparatus 1 (which will be briefly referred to hereinbelow as apparatus 1). Then, as the user turns on startup button switch 54 of the apparatus, apparatus 1 starts to operate (S12) and detects the atmospheric pressure around the area where apparatus 1 is installed and outputs the atmospheric pressure to lamp power determiner 51 (S13).

Lamp power determiner 51 inside main control circuit portion 50, in accordance with the atmospheric pressure detected by atmospheric pressure sensor 61, determines the corresponding value of power supplied to the light source based on the correlation table of the selected mode, stored in correlation table storage 53, that shows the correlation between atmospheric pressure and the value of power supplied to the light source, sets corresponding to the atmospheric pressure, and sends a lighting indication signal and a power level indication signal to lamp power controller 13 in ballast 12 (S14).

After detection of atmospheric pressure, main control circuit portion 50 activates lamp fan 33, air exhaust fan 32, liquid crystal panel unit cooling fan 31 by means of fan rotation rate control circuit 52 and starts a lamp lighting operation (S15).

Ballast 12 causes super-high pressure mercury lamp 21 to glow in accordance with the lighting indication signal and the power level indication signal. At this time, in consideration of the lighting stability of the lamp, the lamp may be started to glow at the maximum output of 300 W and then changed to the designated power (S16).

On the other hand, liquid crystal panel drive circuit 42 that receives video signal 41 starts operation at almost the same time as the lamp is lighted, and the image that is created by the liquid crystal panels is projected as an image on an unillustrated screen by projecting lens 28.

After the series of processing is completed to start projection, the rotation rate control of the fans starts. Main control circuit portion 50 detects the environmental temperature by means of temperature sensor 62 (S17), and based on the correlation table of the selected mode that is stored in correlation table storage 53 and that shows the correlation between the environmental temperature and the value of power supplied to cooling fans 31 to 33 that are set to correspond to the environmental temperature, determines the rotation rate for each fan corresponding to the environmental temperature and controls it (S18). In the mode in which the rotation rates of the fans are also controlled depending on atmospheric pressure, the atmospheric pressure detected by atmospheric pressure sensor 61 is referred. If the correct environmental temperature can be detected by the temperature sensor, the measurement is used. However, if it is predicted that there is a discrepancy between the detected temperature and the actual environmental temperature as a result of the temperature sensor being set inside the apparatus, it is also easily possible to make a correction by storing correcting data beforehand. Detection of the environmental temperature by temperature sensor 62 (S17) is performed as appropriate at intervals of about 10 seconds, and fan rotation rate control circuit 52 controls rotation of the fans so as to be based upon follow variation in the temperature of the installation environment due to air-conditioning etc. (S18).

When the apparatus is shut down, the user turns on stop button switch 55 (S19), so that apparatus 1 transfers to the shutdown operation. Apparatus 1 turns out the super-high pressure mercury lamp 21 (S20), and drives the fans for about 30 seconds (S21) and then stops the fans (S22). The user of the apparatus turns off power switch 16 to end the operation (S23).

Though in the present exemplary embodiment, detection of atmospheric pressure is performed before lighting of the lamp, detection timing may occur during glow mode of the lamp and the power of the lamp may be changed during glow mode.

As described heretofore, the projection display apparatus of the present exemplary embodiment, includes: lamp power controller 13 as a light source power changing means for changing the value of power supplied to super-high pressure mercury lamp 21 as a projecting light source; correlation table storage 53 as a storage medium in which correlation tables, which are previously determined by experimental evaluation and which show the relationship between atmospheric pressure data and the values of power supplied to the lamp, as well as between the ambient environmental temperature and the values of power supplied to the cooling devices, and classified according to the modes that are to be selected by mode select switch 63; atmospheric pressure sensor 61 and temperature sensor 62 as external condition information acquiring means for acquiring ambient external conditions (ambient atmospheric pressure or ambient environmental temperature); and lamp power determiner 51 as a light source power control means, which sends a signal that indicates the value of power supplied to the lamp, from lamp power determiner 51 to lamp power controller 13 of power source unit 10, with reference to the atmospheric pressure/light source supplied power correlation table and the environmental temperature/light source supplied power correlation table based on the atmospheric pressure data from atmospheric pressure sensor 61 and the environmental temperature data from temperature sensor 62.

With this, it is possible to cause super-high pressure mercury lamp 21 to glow with power that is supplied to super-high pressure mercury lamp 21 and that is reduced when the atmospheric pressure around the place where the projection display apparatus is installed is low. As a result, the amount of heat generation from super-high pressure mercury lamp 21 becomes lower, so that the necessity of increasing the amount of air blow of the fan is reduced, thus it is possible to maintain the optical parts at a desirable temperature without increasing noise even at highlands.

Further, the present exemplary embodiment includes: fan rotation rate control circuit 52 as a cooling device power for changing means changing the values of power supplied to fans 31 to 33 as cooling devices; correlation table storage 53 as a storage medium that stores an atmospheric pressure/cooling device supplied power correlation table and an environmental temperature/cooling device supplied power correlation table; and lamp power controller 13 for controlling the value of power supplied to super-high pressure mercury lamp 21 based on a signal indicating the value of power supplied to the lamp, sent from lamp power determiner 51.

With this, it is possible to change the rotation rates of the fans in accordance with altitude, thus it is possible to optimize brightness and noise by increasing the rotation rates of the fans to some degree when it is not preferable to reduce lamp power too much.

The Second Exemplary Embodiment

Figure 9:
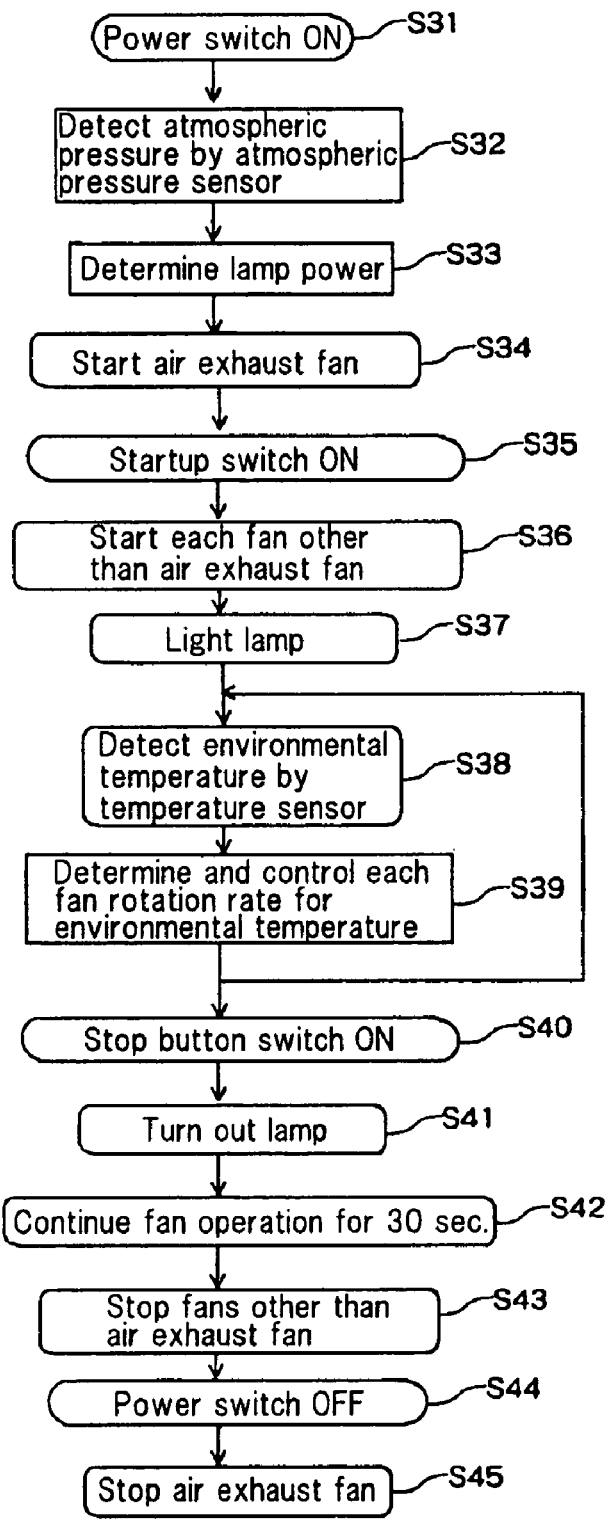
FIG. 9 is a flow chart showing the operation of a projection display apparatus of the second exemplary embodiment of the present invention, from startup to shutdown.

Next, the second exemplary embodiment of the present invention will be described. FIG. 9 is a flow chart showing the operation of the projection display apparatus of the second exemplary embodiment, from startup to shutdown. The configuration of the projection display apparatus is the same as the configuration of the projection display apparatus including a three-panel type liquid crystal image display device in the first exemplary embodiment of FIG. 1.

The present exemplary embodiment is the case where, in the first exemplary embodiment, the apparatus has a plenty of electric functions, hence it generates much heat from power source unit 10 and electric circuit unit 40, so that air exhaust fan 32 has to be operated constantly even in the energized condition (so-called waiting mode in which only power switch 16 is turned on).

In this case, atmospheric pressure sensor 61 cannot detect exact atmospheric pressure that results from the influence of the flow of the cooling wind.

FIG. 9 is a flow chart showing the operation of the projection display apparatus of the second exemplary embodiment, from startup to shutdown. From this, it is possible to understand the timing when the atmospheric pressure sensor detects atmospheric pressure. Description will be made focusing on the difference from the flow chart of FIG. 8 in the first exemplary embodiment.

In the present exemplary embodiment, immediately after power switch 16 is turned on (waiting mode) (S31), atmospheric pressure sensor 61 detects atmospheric pressure (S32) before the air exhaust fan starts, to determine the value of power supplied to the lamp (S33). After this, the air exhaust fan is activated to start cooling power source unit 10 and electric circuit unit 40 (S34).

As startup button switch 54 is pressed (S35), the remaining fans start to operate (S36). The operation after this is basically the same as that in the flow chart of the first exemplary embodiment in FIG. 8.

Ballast 12 causes super-high pressure mercury lamp 21 to glow in accordance with the lighting indication signal and the power level indication signal (S37). Thereafter, control of the rotation rates of the fans is started; main control circuit portion 50 detects environmental temperature through temperature sensor 62 (S38) and determines the rotation rate for each fan corresponding to the environmental temperature and controls the rotation rate (S39).

On the other hand, liquid crystal panel drive circuit 42 that receives video signal 41 starts operation at almost the same time as the lamp is lighted (S37), and the image that is created by the liquid crystal panels is projected as an image on an unillustrated screen by projecting lens 28.

When stop button switch 55 is turned on (S40), super-high pressure mercury lamp 21 is turned off (S41). After completion of a 30 second continuous fan operation to mainly cool super-high pressure mercury lamp 21 (S42), the fans other than air exhaust fan 32 stop (S43). Air exhaust fan 32 continues to operate. When power switch 16 is turned off (S44), air exhaust fan 32 stops (S45).

The Third Exemplary Embodiment

Figure 10:
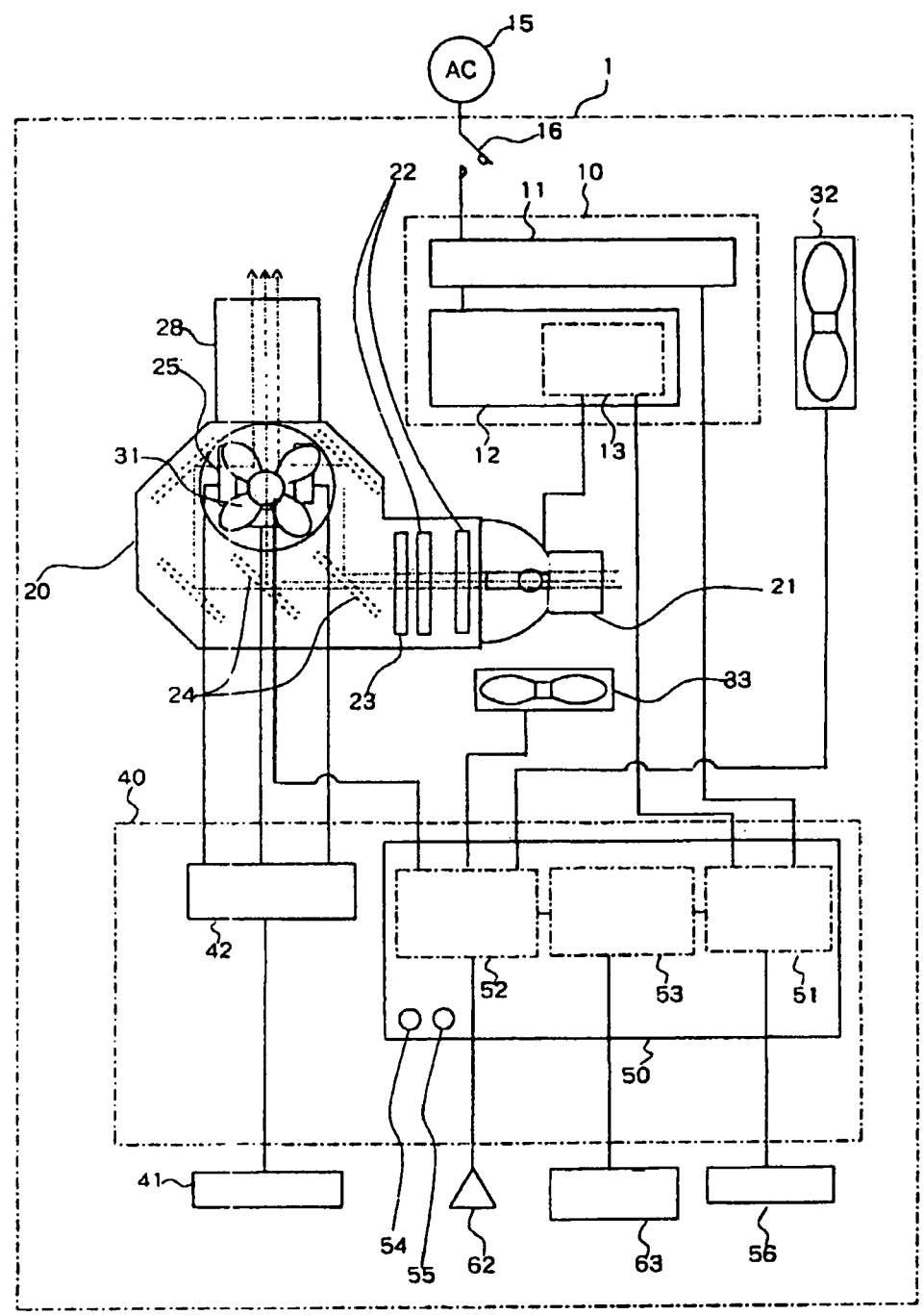
FIG. 10 is a schematic diagram showing the configuration of a projection display apparatus including a three-panel type liquid crystal image display device, according to the third exemplary embodiment of the present invention.
Figure 11:
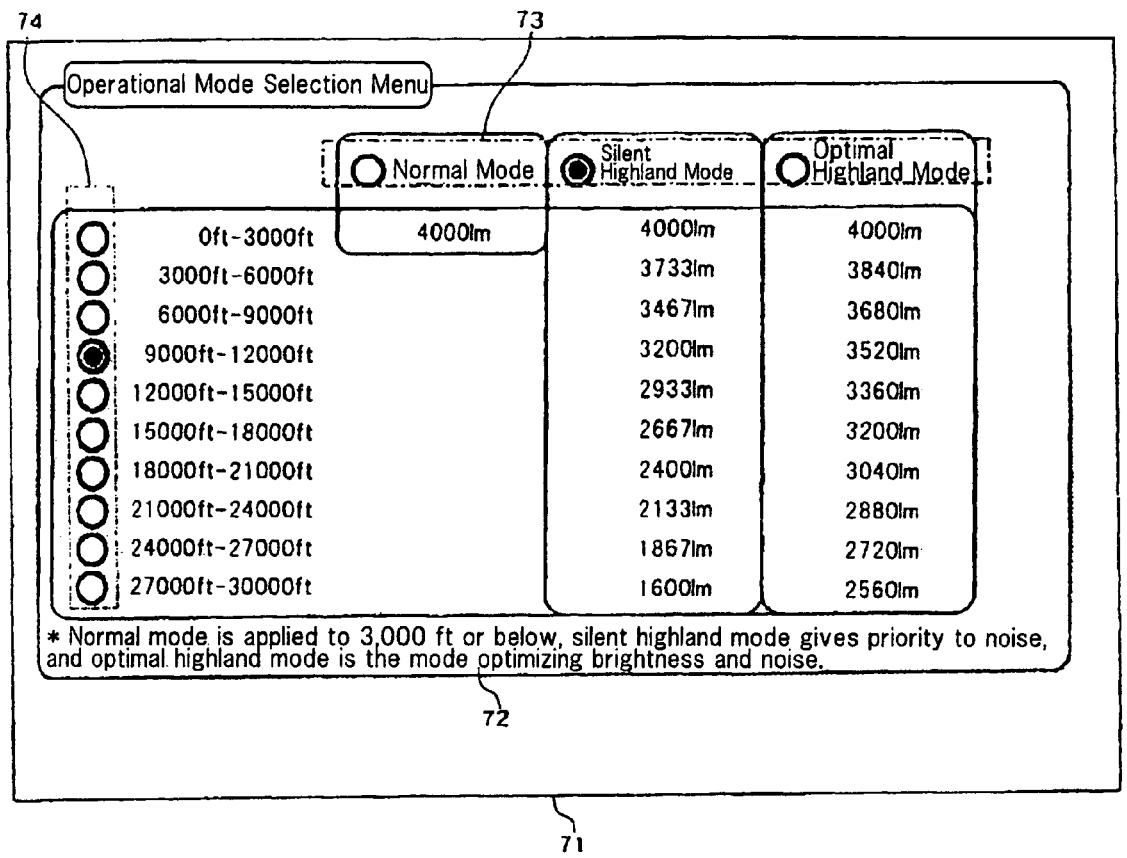
FIG. 11 is a menu frame on a projected image on a screen when operational mode is selected in the apparatus shown in FIG. 10.

Next, the third exemplary embodiment of the present invention will be described. FIG. 10 is a schematic diagram showing the configuration of a projection display apparatus including a three-panel type liquid crystal image display device according to the third exemplary embodiment of the present invention. FIG. 11 is a menu frame on a projected image on a screen when the operational mode is selected in the apparatus shown in FIG. 10.

In the third exemplary embodiment, projection display apparatus 2 is not provided with atmospheric pressure sensor 61 that is provided for projection display apparatus 1 of the first exemplary embodiment, but altitude input portion 56 is connected to main control circuit portion 50 instead, so that the user of projection display apparatus 2 directly inputs the altitude into main control circuit portion 50 through altitude input portion 56. Altitude input portion 56 may use either the method of selecting one altitude from a display showing a plurality of altitudes or the method of inputting a numerical value. Further, similar to the selection of the operational mode, a menu frame may be displayed on the projected image so as to allow for selection using arrow keys, or by arrow keys on a remote controller. The configurations other than this are the same as those of projection display apparatus 1 of the first exemplary embodiment, so description is omitted by assigning them the same reference numerals.

A correlation table that shows the correlation between altitude and the value of power supplied to the lamp, which was determined beforehand by experimental evaluation is stored in correlation table storage 53 of main control circuit portion 50. Main control circuit portion 50 reads out the value of power supplied to the lamp corresponding to the altitude, by reference to the correlation table based on the information on the altitude input through altitude input portion 56, and sends a signal indicating the value of power supplied to the lamp from lamp power determiner 51 to lamp power controller 13 of power source unit 10. Lamp power controller 13, based on the signal, controls the value of supplied power that is to be output to super-high pressure mercury lamp 21.

The difference of FIG. 11 (the third exemplary embodiment) from FIG. 3 (the first exemplary embodiment) resides in that in addition to operational mode select buttons 73 on the projected menu frame, at the upper part of projected menu frame 72, altitude select buttons 74 on the menu frame, projected on the left side on projected menu frame 72, are provided. When an altitude is input from altitude input portion 56, the input altitude is displayed herein. If projection display apparatus 2 is constructed such that it can be started without the value of light source power set up, and if the value of light source power is designated after startup, it is possible to implement mode selection by displaying projected frame 71 of FIG. 11 after startup, and to designate one altitude select button 74 on the displayed, projected menu frame 72 by the arrow keys provided for the apparatus or by the arrow keys of the remote controller.

In the example of this drawing, the altitude of 90,000 ft (2,740 m) to 12,000 ft (3,660 m) is selected. If a style in which the user of the apparatus directly inputs altitude using a menu frame similar to the selection of operational mode is adopted, it is possible to omit altitude input portion 56, and hence to cut down cost.

When the correlation table is given by the correlation between atmospheric pressure and the value of supplied power, a correlation table between altitude and atmospheric pressure is prepared to determine the value of supplied power by converting altitude into atmospheric pressure.

In the present exemplary embodiment, it is assumed that the altitude is input from altitude input portion 56, or that the altitude displayed on the menu frame is directly selected. However, the positional information such as a place name, latitude/longitude, etc., may be displayed on the menu frame to be selected, or may be input, so that it is possible to manage by converting the positional information into altitude based on a positional information/altitude correlation table that records the correlation between the positional information stored inside apparatus 2 and the altitude. There are some operation systems of personal computers into which the name of the place where it is used is entered. If this kind of operation system is utilized, it is possible to estimate the altitude from that information or use this kind of operation system by converting the positional information entered to the OS into altitude.

The Fourth Exemplary Embodiment

Figure 12:
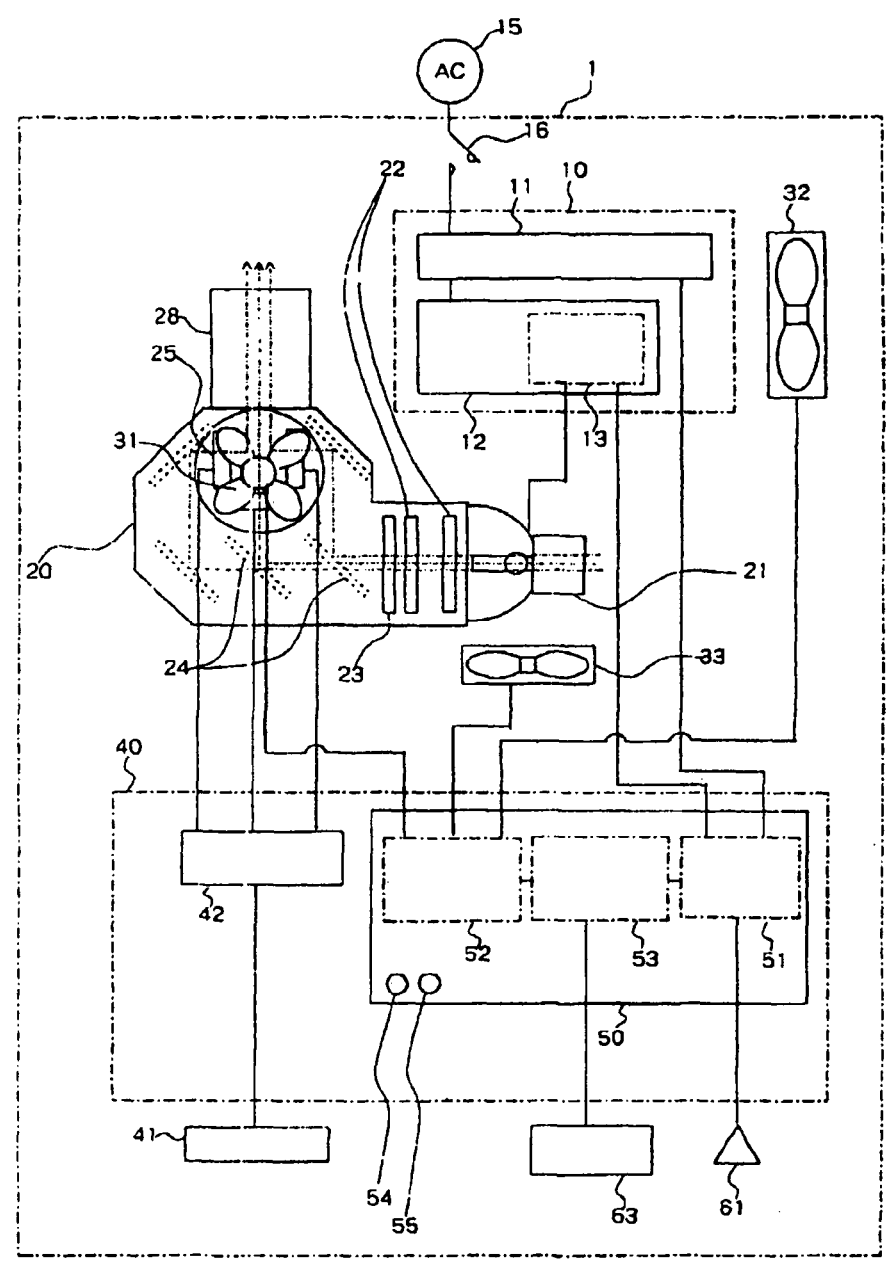
FIG. 12 is a schematic diagram showing the configuration of a projection display apparatus including a three-panel type liquid crystal image display device, according to the fourth exemplary embodiment of the present invention.

FIG. 12 is a schematic diagram showing the configuration of a three-panel type liquid crystal projection display apparatus according to the fourth exemplary embodiment of the present invention. The fourth exemplary embodiment is an exemplary embodiment in which, in the first exemplary embodiment, no temperature sensor 62 is used for fan rotation rate control circuit 51. Since the projection display apparatus has the same configuration as that of the first exemplary embodiment except that no temperature sensor 62 is provided, description is omitted by allotting the same reference numerals to the same components.

The usage temperature range of a typical projection display apparatus is 0° C. to 40° C., and control of the fan rotation rates is performed around room temperature within the range of 25° C. to 35° C. That is, the width of variation in ambient environmental temperature is 10° C., and this temperature rise of 10° C. is regulated by increasing the rotation rates of the fans. However, when the projection display apparatus is used at highlands, as seen in the correlation table in the optimal highland mode of FIG. 6, showing the supportable altitude and its lamp power, the rotation rate of each fan and the apparatus noise for each altitude with respect to the ambient environmental temperature, from 8,320 to 9,140 m (27,000 to 30,000 ft), the fan rotation rates are unvaried taking their maximum values, meaning that fan rotation rate control does not function. Under such condition, no serious hindrance will occur if control based on the ambient environmental temperature is deleted as long as the fan rotation rates are varied depending on altitude.

Accordingly, the present exemplary embodiment deletes the fan control based on a temperature sensor, aiming at miniaturization and reduction in cost of the apparatus.

The Fifth Exemplary Embodiment

Figure 13:
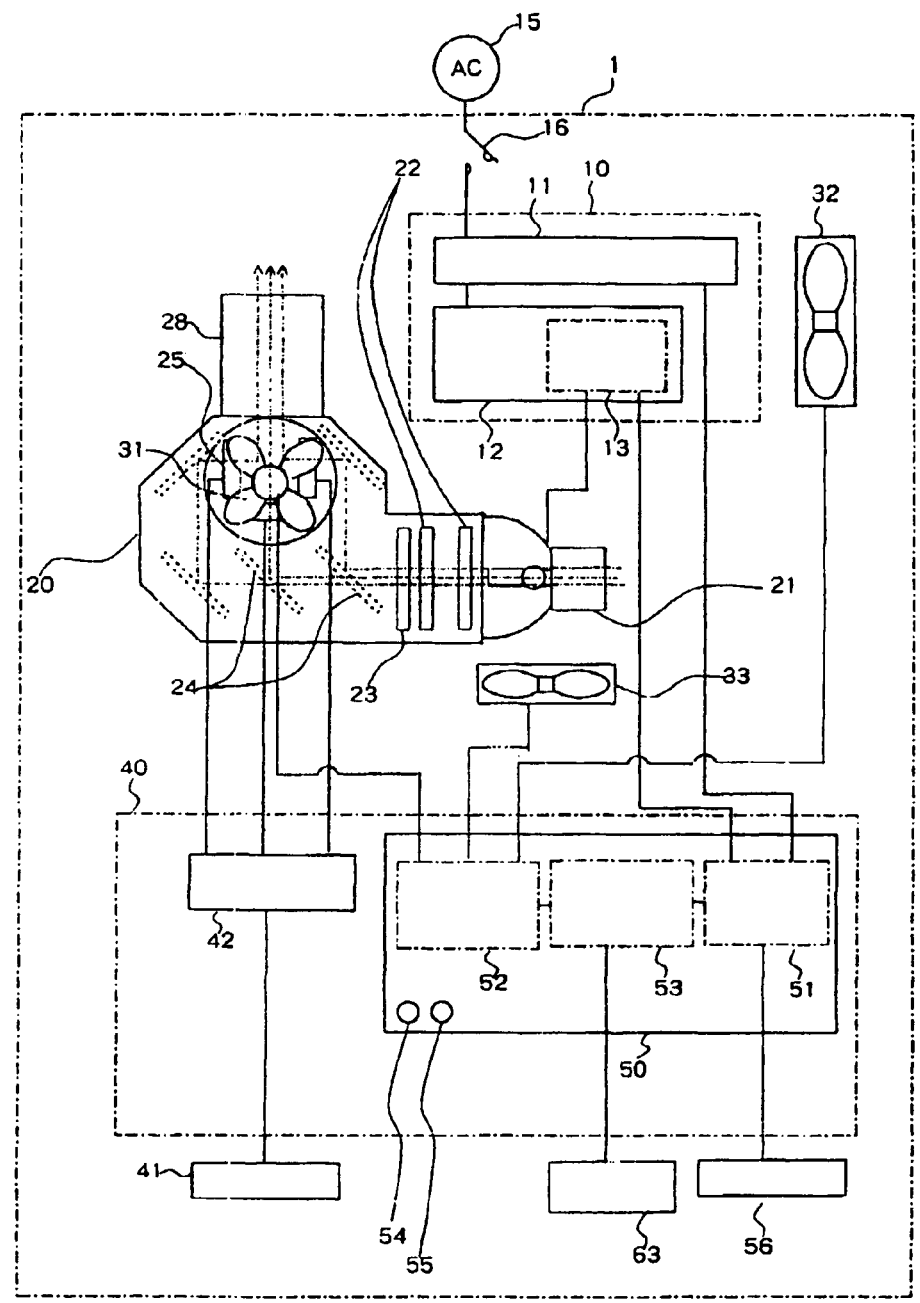
FIG. 13 is a schematic diagram showing the configuration of a projection display apparatus including a three-panel type liquid crystal image display device, according to the fifth exemplary embodiment of the present invention.

FIG. 13 is a schematic diagram showing the configuration of a three-panel type liquid crystal projection display apparatus according to the fifth exemplary embodiment of the present invention. The fifth exemplary embodiment is an exemplary embodiment in which, in the first exemplary embodiment, no atmospheric pressure sensor is used for lamp power determinater 51 and no temperature sensor 62 is used for fan rotation rate control circuit 51.

The fifth exemplary embodiment is provided by omitting atmospheric pressure sensor 61 and adding an external condition input portion such as altitude input portion 56 that permits the user to directly input, data that simulates the relationship between the first exemplary embodiment (FIG. 1) and the third exemplary embodiment (FIG. 10). In the present exemplary embodiment, fan control based on temperature sensor 62 is omitted and atmospheric pressure sensor 61 is deleted, so as to achieve a further miniaturization and cost reduction of the apparatus. Since the difference in functionality is described in the third and fourth exemplary embodiments, description is omitted herein.

This application claims priority based on Japanese Patent Application 2007-092052 filed on Mar. 30, 2007, and should incorporate all the disclosure thereof herein.

The invention claimed is:

1. A projection display apparatus comprising:
a light source power changing unit changing the value of power supplied to a projecting light source;
a storage medium for storing an external condition/light source supplied power correlation table that stores the correlation between an external condition and the value of power supplied to said light source that is set up corresponding to the external condition;
an external condition information acquiring unit acquiring an ambient external condition; and
a light source power control unit which acquires the value of power supplied to the light source corresponding to the external condition acquired by said external condition information acquiring unit, from said external condition/light source supplied power correlation table, and which controls said light source power changing unit so as to produce the acquired value of power that is supplied.

2. The projection display apparatus according to claim 1, further comprising:
a cooling device power changing unit for changing the value of electric power supplied to a cooling device;
a storage medium for storing an external condition/cooling device supplied power correlation table that stores the correlation between an external condition and the value of power supplied to said cooling device that is set up corresponding to the external condition; and,
a cooling device power control unit which acquires the value of power supplied to the cooling device corresponding to the external condition information acquired by said external condition information acquiring unit, from said external condition/cooling device supplied power correlation table, and which controls said cooling device power changing unit so as to produce the acquired value of power that is supplied.

3. The projection display apparatus according to claim 1, wherein said external condition comprises ambient atmospheric pressure.

4. The projection display apparatus according to claim 1, wherein said external condition information acquiring unit comprises an atmospheric pressure detector provided for said projection display apparatus for detecting the ambient atmospheric pressure.

5. The projection display apparatus according to claim 1, wherein said external condition information acquiring unit comprises an atmospheric pressure input portion into which the user inputs atmospheric pressure data.

6. The projection display apparatus according to claim 1, wherein said external condition information acquiring unit includes:
a storage medium for storing a geographical condition/atmospheric pressure correlation table that stores the correlation between a geographical condition at the location where said projection display apparatus is used and the atmospheric pressure set up corresponding to the geographical condition;
a geographical condition input portion into which the geographical condition is input by the user; and,
an atmospheric pressure data reading portion for reading the atmospheric pressure data corresponding to said geographical condition input to said geographical condition input portion, from said geographical condition/atmospheric pressure correlation table.

7. The projection display apparatus according to claim 6, wherein said geographical condition comprises altitude.

8. The projection display apparatus according to claim 6, wherein said geographical condition is positional information relating to altitude including at least one of a place name, latitude and longitude.

9. The projection display apparatus according to claim 1, wherein said external condition comprises ambient environmental temperature.

10. The projection display apparatus according to claim 9, wherein said external condition information acquiring unit comprises an environmental temperature detector provided in said projection display apparatus for detecting the ambient environmental temperature.

11. The projection display apparatus according to claim 9, wherein said external condition information acquiring unit comprises an environmental temperature data input portion into which the ambient environmental temperature is input by the user.

12. The projection display apparatus according to claim 1, wherein the external conditions in said external condition/light source supplied power correlation table and said external condition/cooling device supplied power correlation table include a combination of the ambient atmospheric pressure and the ambient environmental temperature.

13. The projection display apparatus according to claim 1, wherein a plurality of said external condition/light source supplied power correlation tables and said external condition/cooling device supplied power correlation tables are provided, and their selection is made in accordance with the usage mode selected by the user.

14. The projection display apparatus according to claim 13, wherein usage modes include normal mode, silent highland mode and optimal highland mode, in said normal mode, the value of power supplied to said projecting light source is constant while the value of power supplied to said cooling device is changed according to a first rate, depending on the ambient environmental temperature alone, in said silent highland mode, only the value of power supplied to said projecting light source is changed according to a second rate, depending on the atmospheric pressure while the value of power supplied to said cooling device is changed according to a third rate, depending on the ambient environmental temperature alone, and, in said optimal highland mode, the value of power supplied to said projecting light source is changed according to a fourth rate that is smaller than said second rate, depending on the atmospheric pressure while the value of power supplied to said cooling device is changed according to a fifth rate, depending on the atmospheric pressure and is also changed according to a sixth rate that is smaller than said third rate, depending on the ambient environmental temperature.

15. The projection display apparatus according to claim 2, wherein said cooling device comprises air cooling fans including axial fans and scirocco fans.

16. The projection display apparatus according to claim 2, wherein said cooling device comprises an electronic solid-state cooling device including a Peltier device.

17. The projection display apparatus according to claim 4, further comprising:

a power switch for supplying external electric power to said projection display apparatus and a startup switch for starting the operation of the projection display apparatus, wherein the timing at which said atmospheric pressure detecting unit detects the atmospheric pressure is set from when said power switch is turned on to when said startup switch is turned on.

18. A projection display apparatus comprising:

light source power changing means changing the value of power supplied to a projecting light source;

storage means for storing an external condition/light source supplied power correlation table that stores the correlation between an external condition and the value of power supplied to said light source that is set up corresponding to the external condition;

external condition information acquiring means acquiring an ambient external condition; and light source power control means which acquires the value of power supplied to the light source corresponding to the external condition acquired by said external condition information acquiring means, from said external condition/light source supplied power correlation table, and which controls said light source power changing means so as to produce the acquired value of power that is supplied.

* * * * *